US012704479B2

(12) United States Patent
Zlatanski et al.

(10) Patent No.: US 12,704,479 B2
(45) Date of Patent: Aug. 11, 2026

(54) RECEIVER FOR A PULSED EDDY CURRENT SYSTEM

(71) Applicant: ABB Schweiz AG, Baden (CH)

(72) Inventors: Martin Zlatanski, Küsnacht (CH); Parham Davami, Fislisbach (CH); Jarl Sobel, Bagarmossen (SE); Thomas Wiik, Västerås (SE); Jan Nilsson, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 119 days.

(21) Appl. No.: 18/575,897

(22) PCT Filed: Jun. 28, 2022

(86) PCT No.: PCT/EP2022/067770
§ 371 (c)(1),
(2) Date: Jan. 2, 2024

(87) PCT Pub. No.: WO2023/280640
PCT Pub. Date: Jan. 12, 2023

(65) Prior Publication Data
US 2024/0264120 A1 Aug. 8, 2024

(30) Foreign Application Priority Data
Jul. 7, 2021 (EP) .................................... 21184293

(51) Int. Cl.
*G01N 27/90* (2021.01)
*G01B 7/06* (2006.01)
*G01N 27/02* (2006.01)

(52) U.S. Cl.
CPC ........... *G01N 27/9006* (2013.01); *G01B 7/10* (2013.01); *G01N 27/025* (2013.01); *G01N 27/028* (2013.01)

(58) Field of Classification Search
CPC .... G01N 27/025; G01N 27/028; G01N 27/72; G01N 27/90; G01N 27/9006;
(Continued)

(56) References Cited

U.S. PATENT DOCUMENTS 4,110,679 A * 8/1978 Payne .................... G01V 3/107
324/329
5,059,902 A 10/1991 Linder
(Continued)

FOREIGN PATENT DOCUMENTS

KR 20-0137951 Y1 * 5/1999

OTHER PUBLICATIONS

International Search Report and Written Opinion of the International Searching Authority; Application No. PCT/EP2022/067770; Completed: Sep. 22, 2022; Mailing Date: Oct. 4, 2022; 14 Pages.

*Primary Examiner* — David M Schindler
(74) *Attorney, Agent, or Firm* — Greenberg Traurig, LLP

(57) ABSTRACT

A receiver for a Pulsed Eddy Current (PEC) system configured to detect a changing electromagnetic field generated by eddy currents induced in an object of an electrically conductive material. The receiver includes an electrically conductive receiver coil, a high-voltage receiver channel, a low-voltage receiver channel, and an over-voltage protection connected between the receiver coil and the LVRC. The OVP includes a bias circuit B, a diode D connected between the receiver coil and the bias circuit, and a capacitor C connected between the bias circuit and the LVRC.

15 Claims, 2 Drawing Sheets

(58) Field of Classification Search

CPC ........... G01N 27/9046; G01N 27/9066; G01N 27/9073; G01N 27/9093; G01B 7/10; G01B 7/105; H03K 17/945; H03K 17/95; H03K 17/9502; H03K 17/9505; H03K 17/951; H03K 17/9512; H03K 17/9515; H03K 17/9517; H03K 17/952; H03K 17/9522; H03K 17/9525; H03K 17/953; H03K 17/9532; H03K 17/9535; H03K 17/9537; H03K 17/954; H03K 17/9542; H03K 17/9545; H03K 17/9547; H03K 2017/9527

See application file for complete search history.

(56) References Cited

U.S. PATENT DOCUMENTS 6,661,224 B1 12/2003 Linder
7,880,462 B2 * 2/2011 Meyer .................... G01D 5/204 324/207.17
2017/0168016 A1 6/2017 Hardy et al.
2022/0282964 A1 * 9/2022 Linder .................. G01B 7/105

* cited by examiner

RECEIVER FOR A PULSED EDDY CURRENT SYSTEM

TECHNICAL FIELD

The present disclosure relates to a receiver for Pulsed Eddy Current (PEC) system comprising a transmitter configured to generate a changing electromagnetic field which induces eddy currents in an object of an electrically conductive material arranged within the electromagnetic field, and the receiver configured to detect a changing electromagnetic field generated by the eddy currents.

BACKGROUND

PEC, e.g. as described in U.S. Pat. No. 5,059,902, has been successfully applied to the measurement of mechanical quantities, such as electrical resistivity, thickness of non-ferrous metal sheets and edge position.

The method works by creating a static magnetic field in the plate under measurement using a DC current in a transmitter coil. The magnetic field is then suddenly removed by turning off the current, depositing the magnetic energy in suitable load resistors. The first pulse resulting from the current cut-off is measured and its integral can be used to determine the distance between the plate and the coil.

After the current in the transmitter coil has decayed, it is possible to start a measurement of the eddy currents induced in the plate by the sudden change of the applied magnetic field. The change of magnetic field due to the rapid decay of the eddy currents in the plate can induce a small signal which can be measured and analysed in order to deduce the resistivity and the thickness of the plate.

The measurement of the eddy current signal is usually done using a separate receiver coil and a separate measurement receiver channel (RC), specially designed to measure the mV signal from the eddy current decay. The initial pulse resulting from the transmitter current cut-off can be several hundred volts, which is why the eddy current measurement channel must also include some type of Over Voltage Protection (OVP).

The earliest part of the eddy current decay is independent of the thickness, and can be used to get a measure of the resistivity of the plate. The later part depends on the sheet resistivity divided by the thickness. After computing the resistivity and the sheet resistance, the thickness of the plate can be deduced, e.g. as described in U.S. Pat. No. 6,661,224.

Since the initial pulse resulting from the transmitter current cut-off can be several hundred volts, while the later part of the eddy current decay is in the mV range, resulting in a low-voltage (LV) signal, two receiving channels are used, a high-voltage receiving channel (HVRC) with low gain and a low-voltage receiving channel (LVRC) with high gain, which LVRC is protected from the initial pulse by the OVP. As the pulse from the receiver coil is being measured, at the correct instant in time, the OVP circuit is switched from blocking state to passing state in order to present the LV signal at the input of the LVRC and (typically) amplify it with sufficient gain.

Implementing the OVP circuit with a simple solid-state series switch works sufficiently well for thickness measurements of relatively thick objects, e.g. plates, for instance of a thickness of at least 0.5 mm. Unfortunately, as the object thickness decreases, performing the measurement becomes increasingly difficult. In particular:

1) The Signal-to-Noise Ratio decreases, requiring a low-noise, high-resolution receiver;
2) The LV signal decay becomes shorter making it hard to acquire and extract the resistivity information. This requires a coil system and associated front-end with larger bandwidth;
3) The OVP circuit needs to behave as closely to an ideal switch as possible with negligeable switching transients. Long switching transients can lead to masking of the LV signal, making it impossible to extract the resistivity and thickness information therefrom.

SUMMARY

It is an objective of the present invention to provide an improved PEC receiver, including an OVP which facilitates thickness measurements also of thinner objects, e.g. having a thickness of less than 0.5 mm.

According to an aspect of the present invention, there is provided a receiver for a Pulsed Eddy Current (PEC) system configured to detect a changing electromagnetic field generated by eddy currents induced in an object of an electrically conductive material. The receiver comprises an electrically conductive receiver coil, a high-voltage receiver channel (HVRC), a low-voltage receiver channel (LVRC), and an over-voltage protection (OVP) connected between the receiver coil and the LVRC. The OVP comprises a bias circuit B, a diode D connected between the receiver coil and the bias circuit, and a capacitor C connected between the bias circuit and the LVRC.

According to another aspect of the present invention, there is provided a PEC system comprising a transmitter configured to generate a changing electromagnetic field which induces eddy currents in an object of an electrically conductive material arranged within the electromagnetic field, and an embodiment of the receiver of the present disclosure.

According to another aspect of the present invention, there is provided method of determining a thickness of the object by means of an embodiment of the PEC system of the present disclosure. The method comprises, by means of the transmitter, inducing eddy currents in the object. The method also comprises, by means of the receiver measuring, as a function of time, a voltage induced in the receiver coil by the changing electromagnetic field generated by the induced eddy currents, wherein for a voltage induced in the receiver coil which is above a bias threshold provided by the bias circuit, the OVP prevents the induced voltage from being seen by the LVRC, and for a voltage induced in the receiver coil which is below the bias threshold, the OVP allows the induced voltage to be seen by the LVRC. The method also comprises, based on the measurement of the voltage, determining the thickness of the object.

According to another aspect of the present invention, there is provided a computer program product comprising computer-executable components for causing a controller of the PEC system to perform an embodiment of the method of the present disclosure when the computer-executable components are run on processing circuitry comprised in the controller.

The OVP is used for protecting the LVRC from the initial voltage spike, enabling the LVRC to measure the small voltages (mV range) induced by the eddy currents in a stable way. By means of the bias circuit, the diode will be forward biased and thus conducting and enabling the LVRC to detect and measure the signal from the receiver coil, for low voltages (below the bias threshold, e.g. a bias voltage)

induced in the receiver coil, while the diode will be reverse biased and thus blocking the induced voltage for higher voltages (above said bias threshold). By properly selecting the bias threshold provided by the bias circuit, it can be ensured that the diode conducts only when the signal from the receiver coil is below a suitable threshold, thus protecting the LVRC from higher signals. The OVP thus operates without, or with very low, switching transients, resulting in no or at least much lower transients than when using standard semiconductor switches. The low series impedance of the diode when forward-biased and high series impedance when reverse-biased correspond to an OVP circuit which for the requirements of this application is close to behaving as an ideal open circuit in its blocking state and as an ideal short circuit in its conducting state.

The function of the direct current (DC) blocking capacitor is to prevent the LVDC from seeing the bias, e.g. bias voltage or bias current, which is DC and thus blocked by the capacitor.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
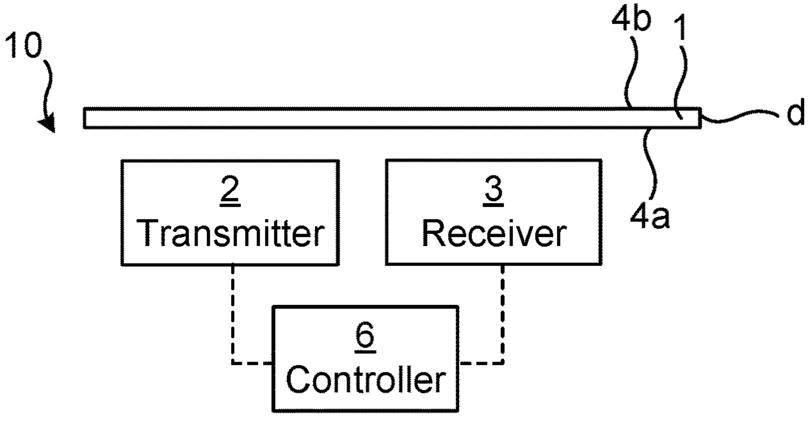
FIG. 1 is a schematic block diagram of an embodiment of the PEC system of the present invention.

FIG. 1 illustrates an embodiment of a PEC system 10 arranged for measuring the thickness d of an object 1, typically a plate (which may also be called sheet metal or strip) of a non-ferrous electrically conducting material such as Al, the object having a first (here lower) side 4*a* and a second (here upper) side 4*b*. In the figure, the object 1 in the form of a plate has a longitudinal axis which is perpendicular to the plane of the figure.

The PEC system 10 comprises a transmitter 2 and a receiver 3. In the figure, both of the transmitter 2 and the receiver 3, specifically the transmitter coil and receiver coil, respectively, thereof are arranged on the same side of the object 1, which is preferred in some embodiments. However, in some other embodiments, the receiver coil may be arranged on the opposite side of the object 1 in relation to the transmitter coil.

The PEC system 10 may comprise a controller 6 for controlling the transmitter 2 and the receiver 3 via control signalling e.g. as illustrated by the dashed lines in the figure. The controller may be formed as a separate device, or be partly or fully integrated with the transmitter and/or receiver. The controller 6 may e.g. comprise a central controller device which is arranged separate from the transmitter and receiver and distributed controller device(s) integrated with the transmitter and/or receiver.

Figure 2:
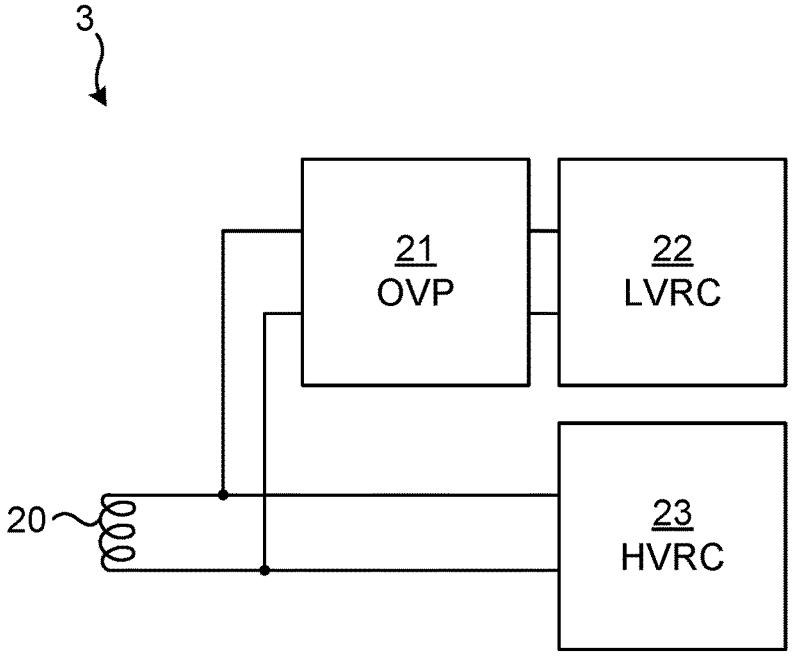
FIG. 2 is a schematic circuit diagram of an embodiment of the receiver of the present invention.

FIG. 2 illustrates an embodiment of the receiver 3. The receiver 3 comprises a receiver coil 20, in which a receiver current can be formed, induced by the changing electromagnetic field resulting from the cut-off of the transmitter current and then by the decay of the eddy currents in the object 1. The receiver current is output as a signal to a RC comprising a HVRC 23 which typically always receives the signal (regardless of voltage), and a LVRC 22 which is protected by an OVP 21 from the signal when it has a voltage which is higher than a predetermined threshold. The OVP 21 is connected between the receiver coil 20 and the LVRC 22. On the signal, voltage measurements may be made by the HVRC 23 and the LVRC 22 for determining properties of the object 1. An amplifier may be connected to the LVRC to facilitate measurement of the relatively low (mV range) voltages therein.

Figure 3:
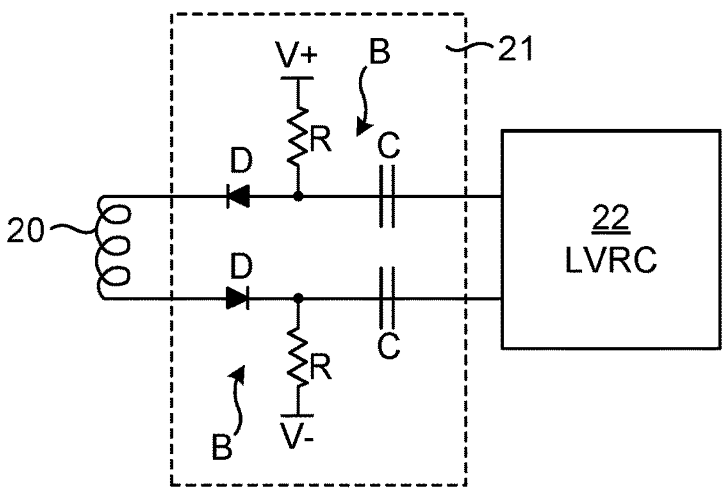
FIG. 3 is a schematic circuit diagram of an embodiment of the LV receiver chain in accordance with the present invention.

FIG. 3 illustrates an embodiment of the LV receiver chain of the receiver 3. The OVP 21 is connected between the receiver coil 20 and the LVRC 22. The OVP comprises at least one bias circuit B, at least one diode D connected between the receiver coil 20 and the bias circuit B, and at least one capacitor C connected between the bias circuit B and the LVRC 22. In the embodiment of FIG. 3, the OVP 21 comprises positive-side circuitry, connected to the positive terminal of the receiver coil 20, and negative-side circuitry, connected to the negative terminal of the receiver coil. Each of the positive- and negative-side circuitries comprises a bias circuit B, a diode D connected between the receiver coil 20 and the bias circuit B, and a capacitor C connected between the bias circuit B and the LVRC 22. It is noted that the diode D of the negative-side circuitry is antiparallel to the diode D of the positive-side circuitry.

The bias circuit B is configured to provide a bias threshold, e.g. by means of a bias voltage V (V+ or V− in the example of FIG. 3) or a bias current, for forward biasing or reverse biasing the diode D depending on the voltage induced in the receiver coil 20. The bias threshold may e.g.

be the absolute value |V| of a bias voltage V+ or V− plus the absolute value of any voltage drop across the diode D. The diode D is reverse biased when the absolute value of the voltage induced in the receiver coil 20 is above the bias threshold, the OVP 21 then preventing the induced voltage from being seen by the LVRC 22, and the diode D is forward biased when the absolute value of the voltage induced in the receiver coil 20 is below the bias threshold, the OVP 21 then allowing the induced voltage to be seen by the LVRC 22. Typically, the bias threshold provided by the bias circuit B of the negative-side circuitry is the same as the bias threshold provided by the bias circuit B of the positive-side circuitry, e.g. the absolute value of a bias voltage V (possibly adjusted for any voltage drop over the diode D).

Figure 4:
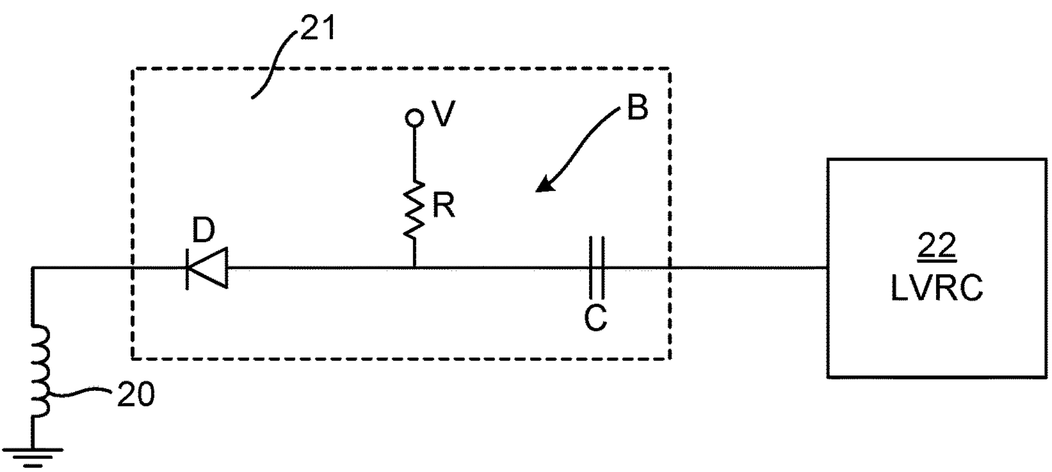
FIG. 4 is a schematic circuit diagram of another embodiment of the LV receiver chain in accordance with the present invention.

FIG. 4 illustrates another embodiment of the LV receiver chain of the receiver 3. In this embodiment, the OVP 21 is only connected to one terminal (positive or negative) of the receiver coil 20. Apart from not having both positive- and negative-side circuitry, the discussion relating to the embodiment of FIG. 3 is also relevant for the embodiment of FIG. 4.

Regardless of the embodiment of the OVP 21 (in accordance with FIG. 3 or FIG. 4 or any other embodiment), the at least one diode D is preferably very fast in switching between its conducting (forward biased) and blocking (reverse biased) states, and vice versa. The diode D may e.g. be a radio frequency (RF) diode.

In some embodiments of the present invention, the diode D, when forward biased, has low series impedance or resistance to function close to being an ideal short circuit, e.g. having an absolute value of series impedance of at most 2Ω, e.g. within the range of 0.5-1.5Ω, such as 1Ω. For the same reason, additionally or alternatively, in some embodiments of the present invention, the diode D when forward biased has an absolute value of series impedance of at most one tenth of the absolute value of an input impedance of the LVRC 22. Similarly, to function close to being an ideal open circuit when reverse biased, the diode D may primarily behave as a small series capacitor, e.g. of 500 fF. In some embodiments, the bias circuit B is configured to provide a bias threshold such that the diode D has said absolute value of series impedance. Additionally or alternatively, the bias circuit B is configured to provide the bias threshold by means of a bias voltage V, e.g. an absolute value of the bias voltage, within the range of 1-3 V.

Preferably, to reduce the required absolute value of the bias voltage V or bias current to provide the desired bias threshold, the voltage drop over the diode D when forward biased should be relatively low, such as of at most 1 V, e.g. within the range of 0.5-0.9 V. In some embodiments of the present invention, the bias threshold is at least 20% above (i.e. 1.2 times) the voltage drop of the diode D when forward biased.

Figure 5:
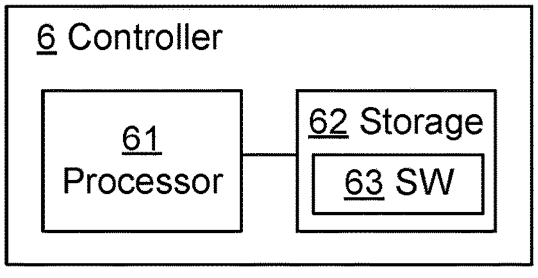
FIG. 5 is a schematic block diagram of a controller in accordance with some embodiments of the present invention.

FIG. 5 schematically illustrates an embodiment of the controller 6 of the present disclosure. The controller 6 comprises processing circuitry 61 e.g. a central processing unit (CPU). The processing circuitry 61 may comprise one or a plurality of processing units in the form of microprocessor(s). However, other suitable devices with computing capabilities could be comprised in the processing circuitry 61, e.g. an application specific integrated circuit (ASIC), a field programmable gate array (FPGA) or a complex programmable logic device (CPLD). The processing circuitry 61 is configured to run one or several computer program(s) or software (SW) 63 stored in a data storage 62 of one or several storage unit(s) e.g. a memory. The storage unit is regarded as a computer readable means, forming a computer program product 62 together with the SW 63 stored thereon as computer-executable components, as discussed herein and may e.g. be in the form of a Random Access Memory (RAM), a Flash memory or other solid state memory, or a hard disk, or be a combination thereof. The processing circuitry 61 may also be configured to store data in the storage 62, as needed. The controller 6 may be configured to perform an embodiment of the method of the present disclosure.

Figure 6:
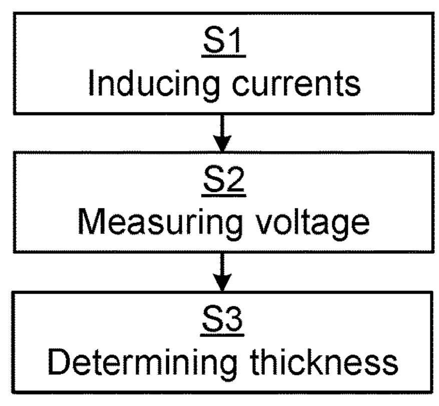
FIG. 6 is a schematic flow chart of a method in accordance with some embodiments of the present invention.

FIG. 6 illustrates some embodiments of the method of the present disclosure. The method is for determining a thickness d of the object 1 by means of an embodiment of the PEC system 10 of the present disclosure. The method comprises, by means of the transmitter 2, inducing S1 eddy currents in the object 1. Then, by means of the receiver 3, the method comprises measuring S2, as a function of time, a voltage induced in the receiver coil 20 by the changing electromagnetic field generated by the induced S1 eddy currents. For a voltage (e.g. absolute value thereof) induced in the receiver coil 20 which is above a bias threshold (e.g. represented by a bias voltage V) provided by the bias circuit B, the OVP 21 prevents the induced voltage from being seen by the LVRC 22 (i.e. the diode D is blocking). For a voltage (e.g. absolute value thereof) induced in the receiver coil 20 which is below the bias threshold (e.g. represented by a bias voltage V), the OVP 21 allows the induced voltage to be seen by the LVRC (i.e. the diode D is conducting). Then, the thickness d of the object 1 is determined S3 based on the measurement S2 of the voltage.

In some embodiments of the present invention, the thickness d is less than 0.5 mm, e.g. within the range of from 0.5 mm to 0.1 mm, such as from 0.4 mm to 0.2 mm. Embodiments of the present invention may be usable also for thicker objects, but the advantages of the invention in relation to prior art is more pronounced for thin objects 1. Embodiments of the present invention may conveniently be used for thicknesses d at least as small as 0.1 mm, sometimes even smaller.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A receiver for a Pulsed Eddy Current, PEC, system configured to detect a changing electromagnetic field generated by eddy currents induced in an object of an electrically conductive material, the receiver comprising:
- an electrically conductive receiver coil;
- a high-voltage receiver channel, HVRC;
- a low-voltage receiver channel, LVRC; and
- an over-voltage protection circuit, OVP, connected between the receiver coil and the LVRC, the OVP including:
  - a bias circuit;
  - a diode connected between the receiver coil and the bias circuit; and
  - a capacitor connected between the bias circuit and the LVRC;
- wherein the bias circuit is configured for providing a bias threshold for forward biasing or reverse biasing the diode depending on a voltage induced in the receiver coil; and
- wherein the capacitor is configured for preventing the LVRC from seeing a bias voltage or current of the bias circuit.

2. The receiver of claim 1, wherein the diode is a radio frequency, RF, diode.

3. The receiver of claim 1, wherein the diode when forward biased has an absolute value of series impedance of at most 2 Ω.

4. The receiver of claim 1, wherein the diode when forward biased has an absolute value of series impedance of at most one tenth of the absolute value of an input impedance of the LVRC.

5. The receiver of claim 3, wherein the bias circuit is configured to provide a bias threshold such that the diode has said absolute value of series impedance.

6. A PEC system comprising:

a transmitter configured to generate a changing electromagnetic field which induces eddy currents in an object of an electrically conductive material arranged within the electromagnetic field; and a receiver for a Pulsed Eddy Current, PEC, system configured to detect a changing electromagnetic field generated by eddy currents induced in an object of an electrically conductive material, the receiver including:

an electrically conductive receiver coil;

a high-voltage receiver channel, HVRC;

a low-voltage receiver channel, LVRC; and an over-voltage protection circuit, OVP, connected between the receiver coil and the LVRC, the OVP including:

a bias circuit;

a diode connected between the receiver coil and the bias circuit; and a capacitor connected between the bias circuit and the LVRC;

wherein the bias circuit is configured for providing a bias threshold for forward biasing or reverse biasing the diode depending on a voltage induced in the receiver coil; and wherein the capacitor is configured for preventing the LVRC from seeing a bias voltage or current of the bias circuit.

7. A method of determining a thickness of the object by means of the PEC system comprising a transmitter configured to generate a changing electromagnetic field which induces eddy currents in an object of an electrically conductive material arranged within the electromagnetic field; and a receiver for a Pulsed Eddy Current, PEC, system configured to detect a changing electromagnetic field generated by eddy currents induced in an object of an electrically conductive material, the receiver including:

an electrically conductive receiver coil;

a high-voltage receiver channel, HVRC;

a low-voltage receiver channel, LVRC; and an over-voltage protection circuit, OVP, connected between the receiver coil and the LVRC, the OVP including:

a bias circuit;

a diode connected between the receiver coil and the bias circuit; and a capacitor connected between the bias circuit and the LVRC;

wherein the bias circuit is configured for providing a bias threshold for forward biasing or reverse biasing the diode depending on a voltage induced in the receiver coil; and wherein the capacitor is configured for preventing the LVRC from seeing a bias voltage or current of the bias circuit;

the method comprising:

by means of the transmitter, inducing eddy currents in the object;

by means of the receiver measuring, as a function of time, a voltage induced in the receiver coil by the changing electromagnetic field generated by the induced eddy currents, wherein:

for a voltage induced in the receiver coil which is above a bias threshold provided by the bias circuit, the OVP prevents the induced voltage from being seen by the LVRC, and for a voltage induced in the receiver coil which is below the bias threshold, the OVP allows the induced voltage to be seen by the LVRC; and based on the measurement of the voltage, determining the thickness of the object.

8. The method of claim 7, wherein the thickness is less than 0.5 mm.

9. The method of claim 7, wherein the diode when forward biased has a voltage drop of at most 1 V.

10. The method of claim 7, wherein the bias threshold is at least 20% above the voltage drop of the diode when forward biased.

11. The receiver of claim 2, wherein the diode when forward biased has an absolute value of series impedance of at most 2 Ω.

12. The receiver of claim 2, wherein the diode when forward biased has an absolute value of series impedance of at most one tenth of the absolute value of an input impedance of the LVRC.

13. The receiver of claim 4, wherein the bias circuit is configured to provide a bias threshold such that the diode has said absolute value of series impedance.

14. The method of claim 8, wherein the diode when forward biased has a voltage drop of at most 1 V.

15. The method of claim 8, wherein the bias threshold is at least 20% above the voltage drop of the diode when forward biased.

* * * * *